(12) United States Patent
Ahmed Salem et al.

(10) Patent No.: US 12,212,439 B2
(45) Date of Patent: Jan. 28, 2025

(54) CHANNEL PREDICTION FRAMEWORK FOR RADIO COMMUNICATION

(71) Applicant: Nokia Technologies Oy, Espoo (FI)

(72) Inventors: Rana Ahmed Salem, Munich (DE); Marco Maso, Issy les Moulineaux (FR); Filippo Tosato, Bures sur Yvette (FR)

(73) Assignee: Nokia Technologies Oy, Espoo (FI)

( * ) Notice: Subject to any disclaimer, the term of this patent is extended or adjusted under 35 U.S.C. 154(b) by 419 days.

(21) Appl. No.: 17/624,902

(22) PCT Filed: Jul. 12, 2019

(86) PCT No.: PCT/EP2019/068854
§ 371 (c)(1),
(2) Date: Jan. 5, 2022

(87) PCT Pub. No.: WO2021/008671
PCT Pub. Date: Jan. 21, 2021

(65) Prior Publication Data
US 2022/0286324 A1    Sep. 8, 2022

(51) Int. Cl.
*H04L 25/02* (2006.01)
*H04B 7/06* (2006.01)
*H04L 5/00* (2006.01)

(52) U.S. Cl.
CPC ....... *H04L 25/0248* (2013.01); *H04B 7/0617* (2013.01); *H04B 7/0626* (2013.01);
(Continued)

(58) Field of Classification Search
CPC .................................................. H04B 17/373
(Continued)

(56) References Cited

U.S. PATENT DOCUMENTS 8,879,660 B1 * 11/2014 Peng ............... H04L 1/0612
375/267
2013/0343481 A1 * 12/2013 Zhang ............. H04B 7/0456
375/295

(Continued)

OTHER PUBLICATIONS

Nokia network, CSI Design for MTC, 3GPP TSG-RAN WG1 Meeting #83 R1-156648 (Year: 2015).*

(Continued)

*Primary Examiner* — Jeffrey M Rutkowski
*Assistant Examiner* — Luna Weissberger
(74) *Attorney, Agent, or Firm* — Barta Jones, PLLC

(57) ABSTRACT

A method for predicting channel state information is described. The method includes determining whether or not geodesic prediction is to be performed and transmitting the determination of whether or not geodesic prediction is to be performed in a first part of uplink control signaling. In response to determining that geodesic prediction is not to be performed, the method includes transmitting a current channel estimate in a second part of uplink control signaling, and in response to determining that geodesic prediction is to be performed, the method includes transmitting either a determined current value of a tangent vector, or a determined step size parameter, or both the determined current value of the tangent vector and the determined step size parameter in the second part of uplink control signaling. Channel state information is predicted based on information provided in the first and second parts of uplink control signaling.

20 Claims, 10 Drawing Sheets

(52) U.S. Cl.
CPC ........... *H04B 7/063* (2013.01); *H04B 7/0641* (2013.01); *H04L 5/0053* (2013.01); *H04L 5/0091* (2013.01); *H04L 25/0204* (2013.01); *H04L 25/0222* (2013.01); *H04L 25/0228* (2013.01)

(58) Field of Classification Search
USPC ........................................................ 370/252
See application file for complete search history.

(56) References Cited

U.S. PATENT DOCUMENTS

2020/0343985 A1* 10/2020 O'Shea .................. G06N 3/045
2020/0412417 A1* 12/2020 Calzolari ............... G06N 3/084

OTHER PUBLICATIONS

Lenovo, Type II CSI overhead reduction, 3GPP TSG RAN1#94bis R1-1811295 (Year: 2018).*
NTT Docomo, Type II CSI feedback overhead reduction, 3GPP TSG RAN WG1 Meeting #96 R1-1902811 (Year: 2019).*
Spreadtrum Communications, Discussion on Type II CSI overhead reduction, 3GPP TSG RAN WG1 Meeting #96bis R1-1904780 (Year: 2019).*
Ayach et al. Grassmannian Differential Limited Feedback for Interference Alignment, Dec. 2012, IEEE (Year: 2012).*
"WI Proposal on NR MIMO Enhancements", 3GPP TSG RAN Meeting #80, RP-181453, Agenda: 9.1.1, Samsung, Jun. 11-14, 2018, 5 pages.
Vook et al., "System level performance characteristics of sub-6GHZ massive MIMO deployments with the 3GPP New Radio", IEEE 88th Vehicular Technology Conference (VTC-Fall), Aug. 27-30, 2018, 5 pages.
"WF on Type I and II CSI codebooks", 3GPP TSG-RAN WG1 #89, R1-1709232, Agenda: 7.1.2.3, Samsung, May 15-19, 2017, 24 pages.
"CSI Overhead Reduction for Type II codebook up to rank 2", 3GPP TSG RAN WG1 Meeting #96, R1-1902562, Agenda: 7.2.8.1, Nokia, Feb. 24-Mar. 1, 2019, 17 pages.
Wild et al., "Multi-antenna OFDM channel feedback compression exploiting sparsity", European Wireless 2013; 19th European Wireless Conference, Apr. 16-18, 2013, 6 pages.
Inoue et al., "Geodesic prediction for limited feedback multiuser MIMO systems in temporally correlated channels", IEEE Radio and Wireless Symposium, Jan. 18-22, 2009, pp. 167-170.
"ZTE's View on Rel-17—ZTE 5G Solution", CMCC workshop, ZTE, 2019, 39 pages.
"Broader Dependent Claims?", Patentlyo, Retrieved on Jan. 5, 2022, Webpage available at : https://patentlyo.com/patent/2014/02/broader-dependent-claims.html.
International Search Report and Written Opinion received for corresponding Patent Cooperation Treaty Application No. PCT/EP2019/068854, dated Mar. 12, 2020, 14 pages.
Ayach et al., "Grassmannian Differential Limited Feedback for Interference Alignment", IEEE Transactions on Signal Processing, vol. 60, No. 12, Dec. 2012, pp. 6481-6494.
"Feedback mechanisms for LTE-A downlink transmission", 3GPP TSG RAN WG1 Meeting #58, R1-093543, Agenda: 15.6, CATT, Aug. 24-28, 2009, 6 pages.

* cited by examiner

Geodesic trajectory of evolution of channel eigenvector over time on Grassmannian manifold $G_{M,1}$ 300

CHANNEL PREDICTION FRAMEWORK FOR RADIO COMMUNICATION

RELATED APPLICATION

This application claims priority to PCT Application No. PCT/EP2019/068854, filed on Jul. 12, 2019, each of which is incorporated herein by reference in its entirety.

TECHNICAL FIELD

The examples and non-limiting embodiments relate generally to communications and, more particularly, to a channel prediction framework for radio communication.

BACKGROUND

It is known to track a fading channel, which fading arises due to, for example, obstacles or inclement weather.

SUMMARY

The following summary is merely intended to be an example. The summary is not intended to limit the scope of the claims.

In accordance with one aspect, a method includes determining whether or not geodesic prediction is to be performed, transmitting the determination of whether or not geodesic prediction is to be performed in a first part of uplink control signaling; in response to determining that geodesic prediction is not to be performed, transmitting a current channel estimate in a second part of uplink control signaling; and in response to determining that geodesic prediction is to be performed, transmitting either a determined current value of a tangent vector, or a determined step size parameter, or both the determined current value of the tangent vector and the determined step size parameter in the second part of uplink control signaling. Channel state information is predicted based on information provided in the first part of uplink control signaling and the second part of uplink control signaling. In some cases, the method includes in response to determining that geodesic prediction is to be performed, transmitting only the determined step size parameter in the second part of uplink control signaling.

In accordance with another aspect, a method includes determining whether or not geodesic prediction is to be performed; transmitting the determination of whether or not geodesic prediction is to be performed in a first part of uplink control signaling; in response to determining that geodesic prediction is not to be performed, transmitting a current channel estimate in a second part of uplink control signaling; and in response to determining that geodesic prediction is to be performed: determining whether or not a determined prior value of a tangent vector is to be used; transmitting the determination of whether or not the prior value of the tangent vector is to be used in the first part of uplink control signaling; in response to determining that the prior value of the tangent vector is not to be used, transmitting either a determined current value of the tangent vector, or a determined step size parameter, or both the determined current value of the tangent vector and the determined step size parameter in the second part of uplink control signaling; in response to determining that the prior value of the tangent vector is to be used, transmitting either a determined step size parameter or nothing in the second part of uplink control signaling. Channel state information is predicted based on information provided in the first part of uplink control signaling and the second part of uplink control signaling.

In accordance with another aspect, a method includes receiving a determination of whether or not geodesic prediction is to be performed in a first part of uplink control signaling; in response to receiving a determination that geodesic prediction is not to be performed, predicting channel state information based on information provided in the first part of uplink control signaling and based on receiving a current channel estimate in a second part of uplink control signaling; and in response to receiving a determination that geodesic prediction is to be performed, predicting channel state information based on information provided in the first part of uplink control signaling and based on receiving either a current value of a tangent vector, or a step size parameter, or both the current value of the tangent vector and the step size parameter in the second part of uplink control signaling. In some cases, the method includes in response to receiving a determination that geodesic prediction is to be performed, predicting channel state information only based on receiving the step size parameter in the second part of uplink control signaling.

In accordance with another aspect, a method includes receiving a determination of whether or not geodesic prediction is to be performed in a first part of uplink control signaling; in response to receiving a determination that geodesic prediction is not to be performed, predicting channel state information based on information received in the first part of uplink control signaling and based on receiving a current channel estimate in a second part of uplink control signaling; and in response to receiving a determination that geodesic prediction is to be performed: predicting channel state information based on receiving a determination of whether or not a prior value of the tangent vector is to be used in the first part of uplink control signaling; in response to receiving a determination that the prior value of the tangent vector is not to be used, predicting channel state information based on either receiving a current value of the tangent vector, or receiving a step size parameter, or both receiving the current value of the tangent vector and receiving the step size parameter in the second part of uplink control signaling; in response to receiving a determination that the prior value of the tangent vector is to be used, predicting channel state information based on either receiving the step size parameter or nothing in the second part of uplink control signaling.

BRIEF DESCRIPTION OF THE DRAWINGS

The foregoing aspects and other features are explained in the following description, taken in connection with the accompanying drawings, wherein.

DETAILED DESCRIPTION OF EXAMPLE EMBODIMENTS

Figure 1:
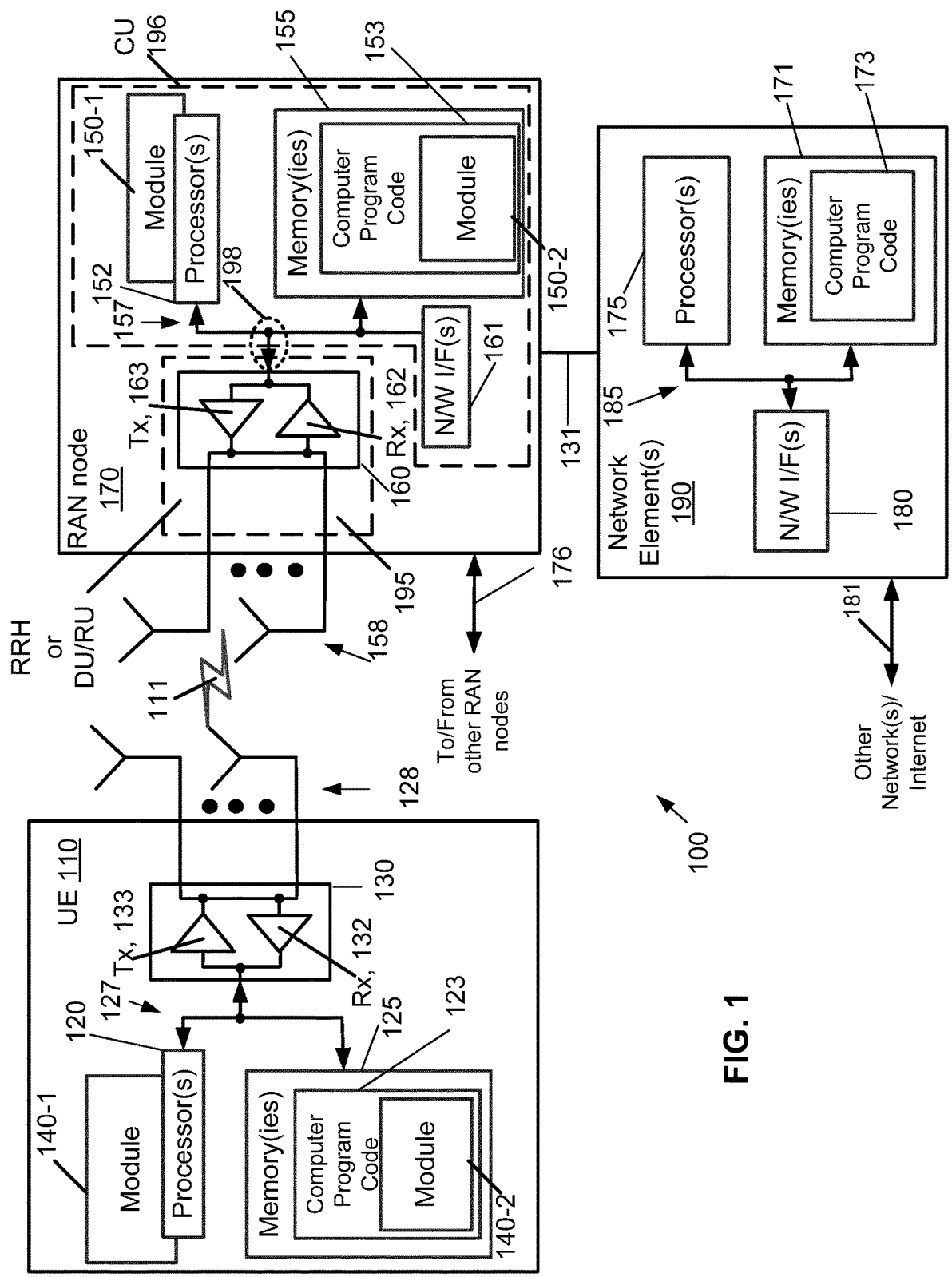
FIG. 1 is a block diagram of one possible and non-limiting system in which the example embodiments may be practiced.

The following acronyms and abbreviations that may be found in the specification and/or the drawing figures are defined as follows:

2D two dimensional
3 GPP third generation partnership project
5G fifth generation
5GC 5G core network
AMF access and mobility management function
BWP bandwidth part
CDF cumulative distribution function
CSI channel state information
CU central unit
DFT discrete Fourier transform
DL downlink
DU distributed unit
DSP digital signal processor
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
ETF explicit time-domain feedback
E-UTRA evolved universal terrestrial radio access, i.e., the LTE radio access technology
FDD frequency division duplex
gNB (or gNodeB) base station for 5G/NR, i.e., a node providing NR user plane and control plane protocol terminations towards the UE, and connected via the NG interface to the 5GC
I/F interface
LC linear combination
LTE long term evolution
MAC medium access control
MIMO multiple-input/multiple-output
MME mobility management entity
ng or NG new generation
ng-eNB or NG-eNB new generation eNB
NR new radio
N/W or NW network
PCA principal component analysis
PDA personal digital assistant
PDCP packet data convergence protocol
PHY physical layer
PMI precoding matrix indicator
PRB physical resource blocks
RAN radio access network
RB resource block
Rel. release
RLC radio link control
RRH remote radio head
RRC radio resource control
RU radio unit
Rx receiver
SB subband
SDAP service data adaptation protocol
SGW serving gateway
SMF session management function
SVD singular value decomposition
Tx transmitter
UCI uplink control information
UE user equipment (e.g., a wireless, typically mobile device)
UL uplink
UMi urban microcells
UPF user plane function
UPT user perceived throughput
WB wideband
WI work item
WID work item description Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR).

In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF (s)) and/or session management function (s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

To track a fast fading channel, one option is to increasing periodicity of channel state information (CSI) reporting. However, that requires higher signaling overhead. Another option is to use prediction. However, since type II CSI feedback corresponds to compressed and quantized eigenvectors, conventional prediction methods (e.g. Kalman filtering) cannot be used. The examples described herein perform and implement 'geodesic' prediction as a means for predicting CSI type II values.

In a first example embodiment, the UE decides, based on a 'chordal distance' between a known channel estimate and a predicted channel estimate, whether or not to perform geodesic channel prediction. The decision is transmitted to the gNB via a bitmap, together with either a tangent vector (a predication related parameter from which the gNB estimates the channel estimate) or the channel estimate.

In a second example embodiment, the UE decides, whether or not to use an old value of the tangent vector. The decision is transmitted to the gNB via a bitmap, together with the tangent vector for the case that the UE decides that an old value should not be used.

In a third example embodiment, the UE feeds back, only the step size (another predication related parameter). The gNB then uses the step size to compute the tangent vector from previous channel estimates.

In Rel. 15, NR type II reporting is a scheme used by the UE to feed back a PMI to the gNB, which the latter should use as is (note that how the PMI is actually used by gNB is an implementation detail). This approach supports up to rank=2 transmission and is commonly understood as a way to convey information on the strongest eigenvectors measured at the UE, i.e., an approximation scheme for CSI feedback. For this reason, we will refer to this scheme as NR type II CSI reporting in the following, for simplicity. Furthermore, we may use the words PMI/CSI interchangeably, unless otherwise stated, given that their conceptual difference is not relevant in the context of this disclosure. Switching the focus back to the rank limitation of Rel. 15, NR type II reporting, we observe that such restriction is mostly due to the large feedback overhead that would result from a higher rank feedback. Indeed, the feedback overhead of NR type II would scale linearly with the rank of the PMI feedback, if the legacy framework were simply extended. This would require a significant increase of the necessary uplink resources to perform the feedback. Despite this limitation, legacy Type II codebook can achieve up to 36% performance enhancement over LTE at the cost of higher feedback overhead as compared to the latter [see, e.g., F. V. et al, "System level performance characteristics of sub-6 GHz massive MIMO deployments with the 3GPP New Radio," in IEEE VTC Fall 2018, 2018].

An overview on NR type II reporting in Rel.15 is as follows [see, e.g., R1-1709232 "WF on Type I and II CSI codebooks" RAN1 #89 May 2017]. The final weighting vector at the gNB is a weighted linear combination of L orthogonal beams per polarization as $$\tilde{w}_{r,l} = \sum_{i=0}^{L-1} b_{k_1^{(i)} k_2^{(i)}} \cdot p_{r,l,i}^{(WB)} p_{r,l,i}^{(SB)} \cdot c_{r,l,i} \qquad (1)$$

The term $$b_{k_1^{(i)} k_2^{(i)}}$$

is the long-term two-dimensional (2D) discrete Fourier transform (DFT) beam, the term $p_{r,l,i}^{(WB)}$ is the beam power scaling factor for wideband, the term $p_{r,l,i}^{(SB)}$ is the beam power scaling factor for subband, and the term $c_{r,l,i}$ is the beam combining coefficient.

In order to build $\tilde{w}_{r,l}$, the following steps are performed:
1. Building the grid-of-beam matrix $W_1$ of size $2N_1N_2 \times 2L$: choose L orthogonal vectors/beams per polarization r from a set of oversampled $O_1O_2N_1N_2$ DFT beams, where $N_1$ and $N_2$ are the number of antenna ports in horizontal and vertical domains. $O_1$ and $O_2$ are the oversampling factors in both dimensions. This collection of vectors can be used to approximate the eigenvectors of the channel covariance matrix by means of suitable weighted linear combinations. This operation achieves a compression in the spatial domain (SD), hence the resulting 2L beams are also referred to as SD components.
2. Building the linear combination subband matrix $W_2$: for every subband, calculate the coefficients to be used for the weighted linear combination of the columns of $W_1$ yielding the aforementioned approximation of the 1 strongest eigenvectors of the channel covariance matrix.
3. Quantization of linear combining coefficients: the correlation between the coefficients of the different $W_2$ across all the subbands is exploited to achieve a reduction of the overall number of coefficients to feed back by means of a differential wideband+subband quantization.

Enhancement of type II reporting feedback for Rel. 16 was agreed in 3GPP based on exploiting the frequency correlation. A frequency domain compression scheme is applied on subband matrix $W_2$. The precoder for each layer and across frequency-domain units W is derived as follows:

$$W = W_1 \tilde{W}_2 W_f^H \qquad (2)$$

Rel. 16 NR type II reporting could provide a significant gain over its Rel.15 counterpart, as shown in [R1-1902562 CSI Overhead Reduction for Type II codebook up to rank 2, Nokia, RAN1 #96 Athens].

Figure 2A:
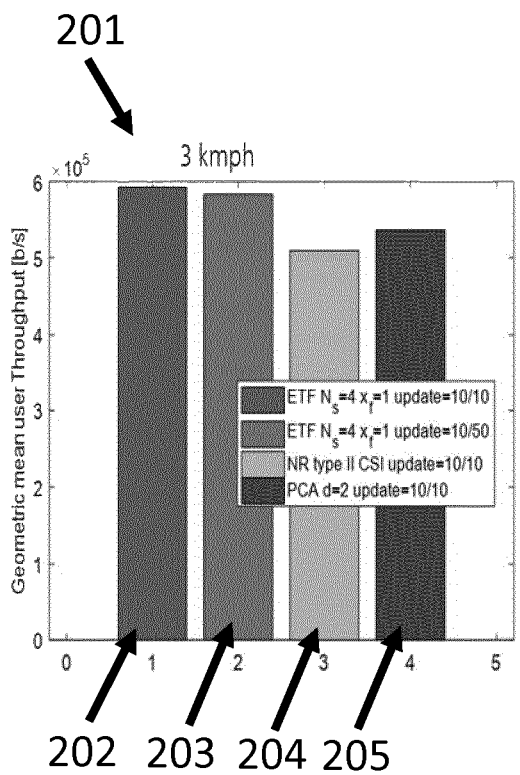
FIG. 2A depicts a comparison of channel sate information feedback schemes for a user speed of 3 kmph.
Figure 2B:
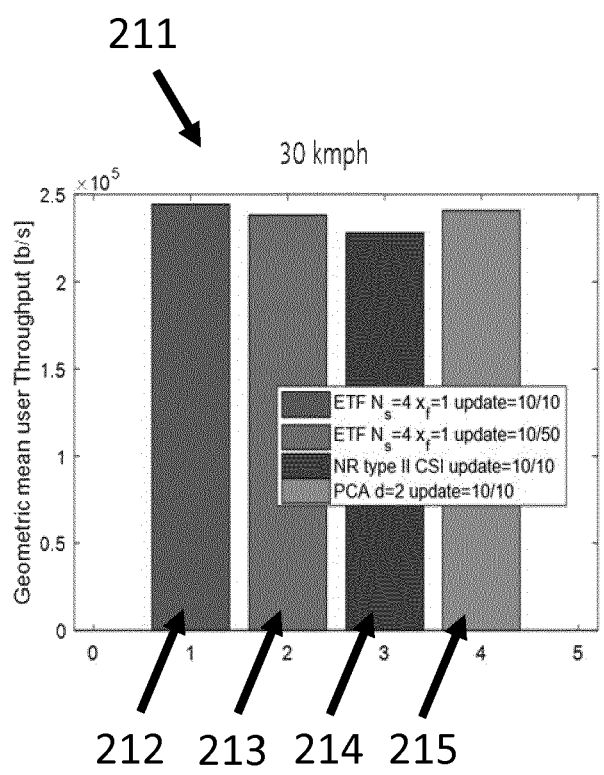
FIG. 2B depicts a comparison of channel sate information feedback schemes for a user speed of 30 kmph.

Another problem which faces CSI feedback in a frequency division duplex (FDD) system is the fast fading channel. In FIG. 2A and FIG. 2B, the geometric mean user throughput is shown for two cases of user speed at 3 kmph (chart 201) and 30 kmph (chart 211) at an update periodicity of 10 ms in an urban microcells (UMi) channel. In charts 201 and 211, bars 202 and 212 correspond to ETF $N_S=4x_f=1$ update=10/10, bars 203 and 213 correspond to ETF $N_S=4x_f=1$ update=10/50, bars 204 and 214 correspond to NR type II CSI update=10/10, and bars 205 and 215 correspond to PCA d=2 update 10/10. At 3 kmph, the explicit time domain feedback scheme is outperforming Rel.15 NR type II CSI. In the right chart, at 30 kmph, all schemes perform more or less the same and the overall UPT is reduced by more than 50% due to the effect of channel aging. In fact, in such a case it is best to resort to the least complex and smallest overhead scheme, because any gain is reduced by the channel aging effect.

An example work around is to perform the CSI feedback at a higher periodicity, however clearly this increases the UL overhead significantly. Examples disclosed herein provide a channel prediction framework for NR type II CSI with improved performance overhead trade-off Channel prediction can be used for explicit CSI feedback [see, e.g., T. Wild, C. Hoek, G. Herzog and J. Koppenborg, "Multi-antenna OFDM channel feedback compression exploiting sparsity," European Wireless 2013; 19th European Wireless Conference, Guildford, U K, 2013, pp. 1-6.], Algorithms based on Wiener filtering or Kalman filtering can provide very good performance. That is actually one of the motivation points for having explicit CSI feedback. In order to judge the deviation of the explicit CSI estimate, it is sufficient to compute the mean square error, defined as $$e = \|H - \hat{H}\|_F \qquad (3)$$

In NR type II CSI in Rel. 15 and 16, approximated eigenvectors are possibly compressed (for Rel.16), quantized and fed back to the gNB. Naturally, channel eigenvectors cannot be predicted on the Euclidean space as in explicit CSI case. Two (non-zero) vectors $s_1, s_2 \in \mathbb{C}^M$ are called equivalent $s_1 \sim s_2$ in terms of subspaces if and only if there exists a (non-zero) scalar $a \in \mathbb{C}$ such that $s_1 = as_2$. A different criterion to judge the deviation between two normalized eigenvectors $s_1$ and $s_2$ would be to compute the chordal distance, which is sine of the angle between the two eigenvectors on the Grassmannian manifold $G_{M,1}$, represented as:

$$d_c(s_1, s_2) = \sin(\theta_{1,2}) = \sqrt{1 - \|s_1^H s_2\|} \qquad (4)$$

Certain examples disclosed herein implement the chordal distance to develop an algorithm for predicting CSI type II values and to judge the performance of the example algorithms.

The Grassmannian manifold $G_{M,N}$ is a representation of subspaces of dimension M in $\mathbb{C}^N$. Such a subspace can be described as the linear span of an orthonormal basis, and that basis can be captured by the columns of a matrix $X_{M \times N}$ that satisfies $X^H X = I$. As there is a continuum of matrices that can represent a given subspace, these matrices can be deemed to form an equivalence class in terms of representing subspaces. Each "point" on the Grassmannian manifold is a single matrix that represents this equivalence class for the given subspace.

Figure 3:
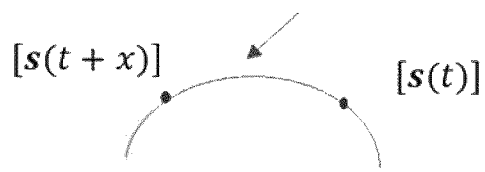
FIG. 3 depicts a geodesic trajectory of evolution of a channel eigenvector over time on the Grassmannian manifold $G_{M,1}$.

The concept of prediction on the Grassmannian manifold is related to the geodesic path between two points on the Grassmannian manifold. The geodesic path is a generalization of a shortest straight line connecting two points on a curved space (e.g. Grassmannian manifold). In FIG. 3, the geodesic trajectory of evolution of the channel eigenvector over time on the Grassmannian manifold $G_{M,1}$ is depicted as item 300.

Figure 4:
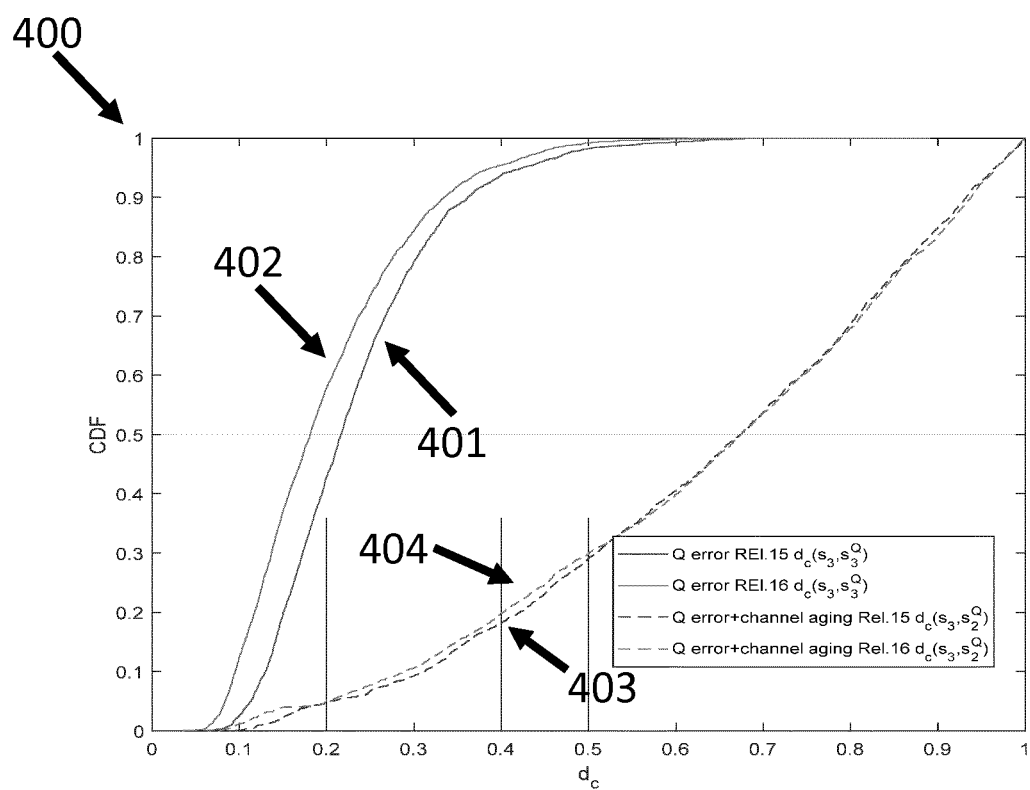
FIG. 4 depicts the cumulative distribution function for Rel. 15 and Rel. 16 with and without channel aging effect.

Assuming a channel eigenvector for one subband at 3 time instances (at 5 ms, at 10 ms and 15 ms): $s_1$, $s_2$ and $s_3$ for a user at speed 30 kmph in a DUMa channel at 4 GHz, 10 MHz bandwidth and $N_3=13$ subbands and a drop of 210 users. $s_i^Q$ is the compressed and quantized PMI according to NR type II CSI Rel.15 or Rel.16. Both Rel. 15 and Rel.16 NR type II CSI used L=4 spatial beams per polarization. In FIG. 4, the chordal distance cumulative distribution function (CDF) is shown for Rel. 15 and 16 with and without channel aging effect as chart 400. Plot 401 corresponds to Q error Rel. 15 $d_c(s_3, s_3^Q)$, plot 402 corresponds to Q error Rel. 16 $d_c(s_3, s_3^Q)$, plot 403 corresponds to Q error+channel aging Rel. 15 $d_c(s_3, s_2^Q)$, and plot 404 corresponds to Q error+channel aging Rel. 16 $d_c(s_3, s_2^Q)$. Release 16 used M=7 and $K_0=42$. As shown, by comparing the solid curves significant improvement is brought by Rel. 16 compression and quantization. However, most of this gain is lost when the effect of channel aging is considered (or when channel aging manifests), i.e., when comparing $s_3$ against $s_2^Q$ from 5 ms earlier.

Geodesic prediction is described as follows. To write an equation for the geodesic from the point [s(t)] on the manifold to the point [s(t+1)], the tangent to the manifold at the point [s(t)] in the direction of the point [s(t+1)] is used. Such tangent can be written as (refer to, e.g., T. Inoue and R. W. Heath, "Geodesic prediction for limited feedback multiuser MIMO systems in temporally correlated channels," in Proc. IEEE Radio Wireless Symp., January 2009)

1.

$$b[t+1] = (\tan^{-1}(\beta)) \frac{(\alpha s(t+1) - s(t))}{\beta}$$

Where $$\alpha = \frac{1}{s(t+1)^H s(t)},$$

$\beta = \|\alpha s(t+1) - s(t)\|$

Figure 5:
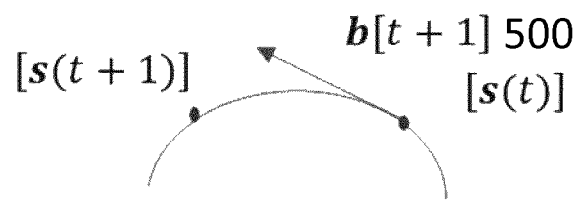
FIG. 5 is an illustration of a tangent to a Grassmannian manifold at the point [s(t)] in the direction of the point [s(t+1)].

2. Apply thin singular value decomposition (SVD) of tangent vector $b[t+1] = u (\tan^{-1}(\tilde{\sigma})) v^*$
3. Compute scaled tangent vector: $\gamma(t+1) = \epsilon \|b[t+1]\|$
4. Given knowledge of $\hat{s}(t)$, build $\tilde{s}(t+1) = \hat{s}(t) v \cos(\gamma(t+1) \tilde{\sigma}) + u \sin(\gamma(t+1) \tilde{\sigma})$ A graphical depiction of the tangent vector b[t+1] 500 is shown in FIG. 5.

Channel prediction schemes based on explicit CSI feedback or based on machine learning are possible solutions for proposal to 3GPP [see, e.g., ZTE, "ZTE's View on Rel-17— ZTE 5G Solution" CMCC workshop 2019]. Another alternative proposal is geodesic prediction for NR type II CSI. Several options for the communication of the step size and the tangent vector between the gNB and the UE are disclosed herein.

In particular, disclosed herein is a novel framework based on geodesic channel prediction for radio communication to mitigate and compensate for the problem of channel aging. The method disclosed herein exploit the temporal correlation of each eigenvector inside the linear combination subband matrix $W_2$ which is of size $2L \times N_3$ or on the full eigenvector subband matrix $W=W_1W_2$ which is of size $2N_1N_2 \times N_3$. Differential information is fed back per subband (or group of subbands) from the UE to the gNB based on the geodesic path of the eigenvectors in the time domain, namely a tangent vector and/or step size parameter. The proposed scheme can significantly reduce required UL overhead. Required UL overhead is reduced because instead of feeding back a full update, only differential information based on the geodesic path of the eigenvector across time is going to be fed back, which requires lower UL overhead.

Several options for the signaling schemes of the differential information and the processing at the gNB and the UE is provided in detail. Simulation results indicate a very low UL overhead (e.g., approximately 26 bits), and that the proposed scheme reduces the chordal distance error for NR type II CSI Rel. 15 and Rel. 16.

In general, a UE can be configured to use geodesic prediction (depending on its UE capability) by the gNB in RRC signaling.

Embodiment 1. In a first example embodiment, the UE decides whether or not to perform geodesic channel prediction for every subband. The decision is transmitted to the gNB via a bit-map p. Depending on the bit-map value, the UE is going to feedback the geodesic parameters for the selected subbands for channel prediction.

Figure 6:
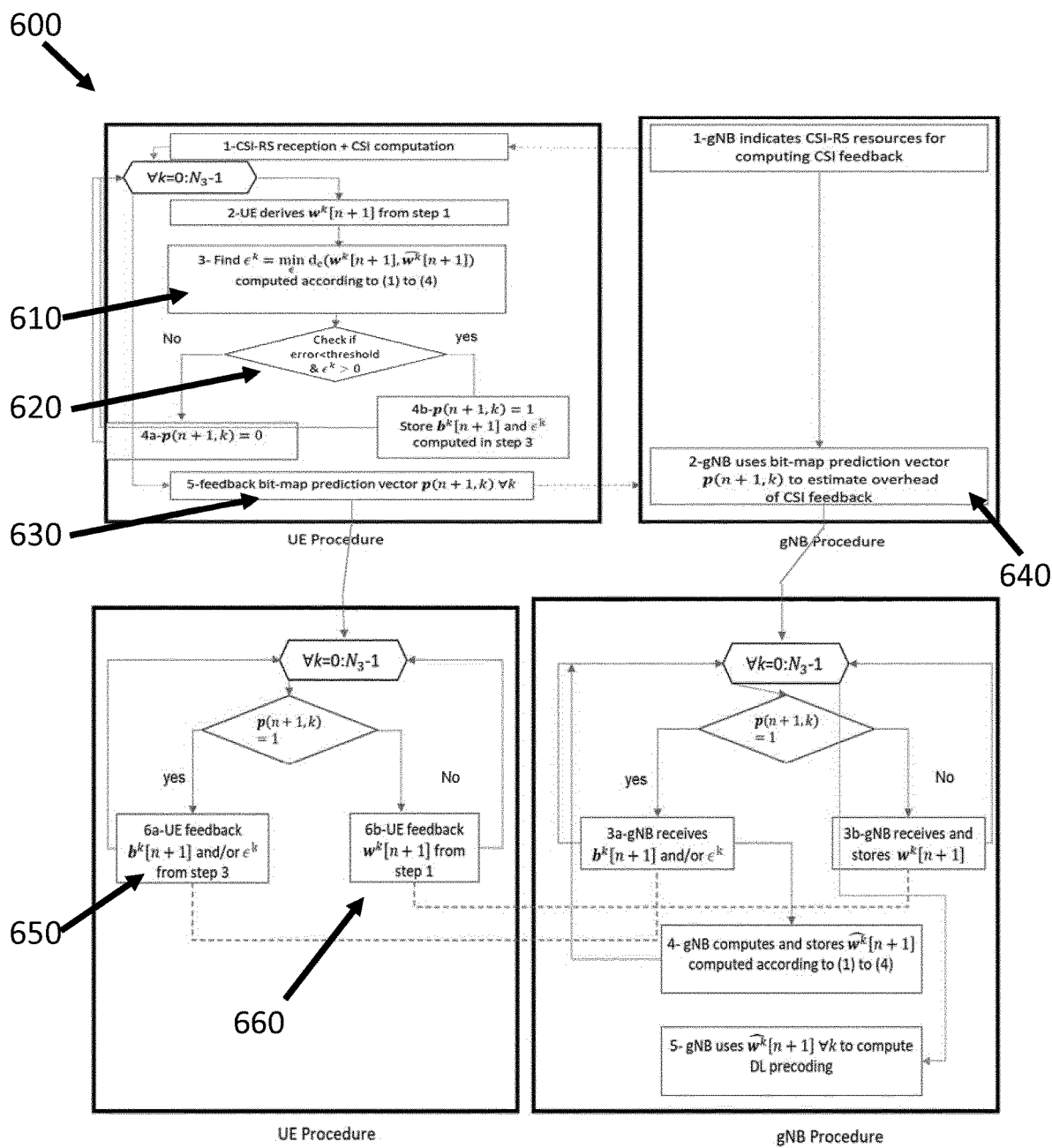
FIG. 6 illustrates a process for performing channel state information prediction according to a first example embodiment of the invention in which a user equipment (UE) determines whether or not to perform geodesic channel prediction for every subband.

The first example embodiment is shown in the UE-gNB procedure 600 of FIG. 6. At time instant n+1 (where time instant n+1 occurs at a later time than prior time instant n), for every subband k:

1. The UE finds (at 610) the best step size parameter $\epsilon$ which minimizes the chordal distance between $w^k[n+1]$ and the predicted $\widehat{w^k}[n+1]$ derived according to steps 1 to 4 (identical to steps a to d below) for writing the equation for the geodesic explained before, where $s(t)$ is mapped to $\widehat{w^k}[n]$ derived according to NR type II CSI in previous feedback instant n and $s(t+1)$ is mapped to $w^k[n+1]$:

a.

$$b[n+1] = (\tan^{-1}(\beta))\frac{(\alpha w^k[n+1] - \widehat{w^k}[n])}{\beta}$$

i. where $$\alpha = \frac{1}{w^k[n+1]^H w^k[n]}$$

$\beta = \|\alpha w^k[n+1]^* - \widehat{w^k}[n]\|$ b. Apply thin SVD of tangent vector $b[n+1] = u (\tan^{-1}(\sigma)) v^*$
   c. Compute scaled tangent vector: $\gamma(n+1) = \epsilon \|b[n+1]\|$
   d. Given knowledge of $\widehat{w^k}[n]$, build $\widehat{w^k}[n+1] = \widehat{w^k}[n]v \cos(\gamma(n+1)\sigma) + u \sin(\gamma(n+1)\sigma)$ 2. Depending on the possible minimum chordal distance, the UE decides (at 620) whether or not channel prediction is performed on that particular subband.

3. The UE feeds back (at 630) a bit-map p(n+1,k) of size $N_3 \times 1$ in a first part of uplink control signalling, where a value of '1' means that this subband will be predicted and a value of '0' means this subband will not be predicted. Using that bit-map, the gNB can predict the UL overhead in the next step (at 640). For instance if NR type II feedback scheme is used this signaling could occur in uplink control information (UCI) part 1.

4. For all subbands which had a value of '1' inside the bit-map, the UE feeds back the tangent vector b[n+1] or the step size $\epsilon$ or both (at 650) in a second part of uplink control signaling. For instance if NR type II feedback scheme is used this signaling could occur in UCI part 2.

5. For all subbands which had a value of '0' inside the bit-map, the UE feeds back $w^k[n+1]$ (at 660). As in standard.

Embodiment 2. In a second example embodiment, the UE decides whether or not to use the old value of the tangent vector for every subband. The decision is transmitted to the gNB via a bit-map p'. Depending on the bit-map value, the UE is going to feedback the tangent vector for the selected subbands inside the bit-map p'.

Figure 7:
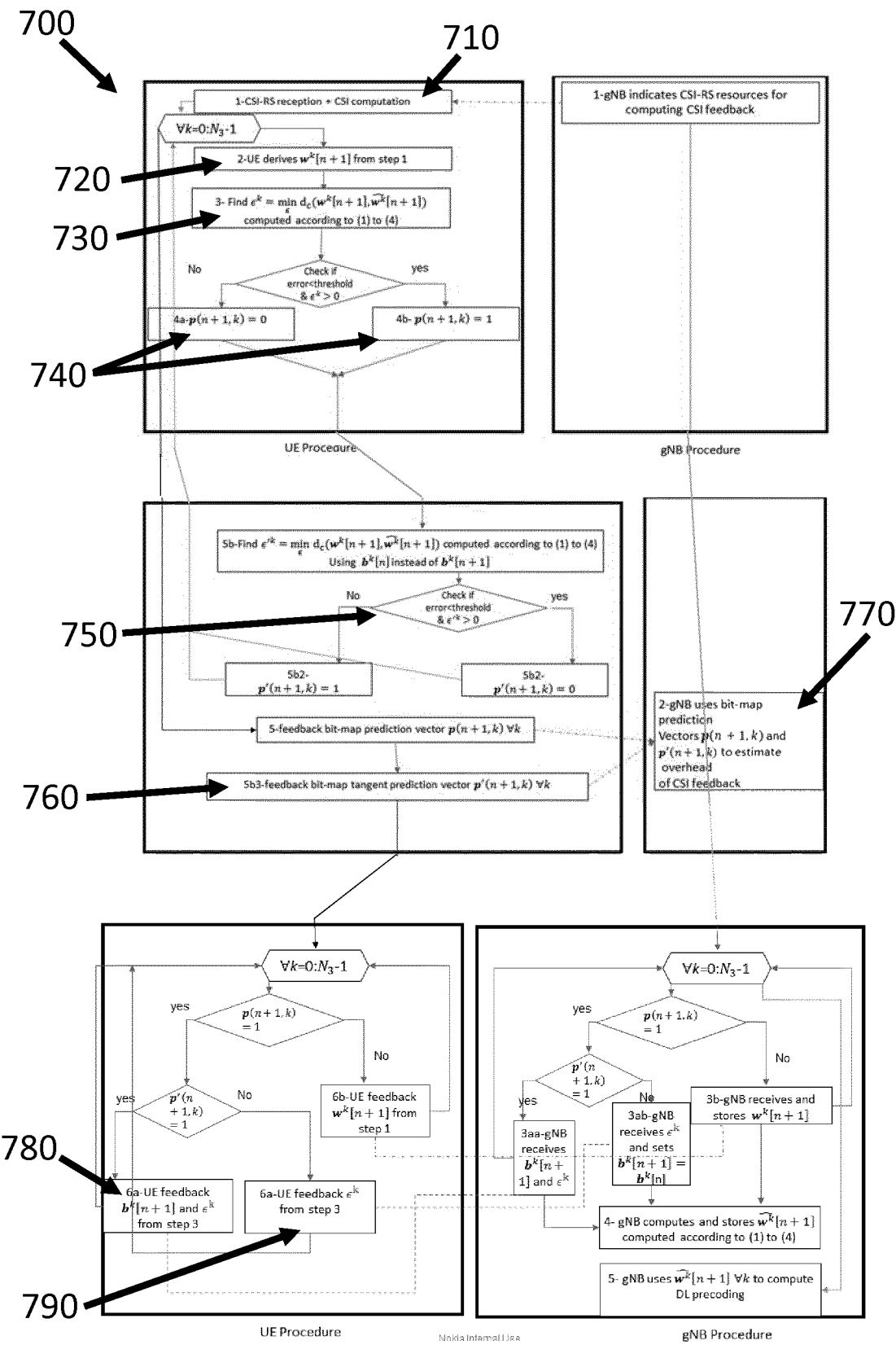
FIG. 7 illustrates a process for performing channel state information prediction according to a second example embodiment of the invention in which a user equipment (UE) determines whether or not to use an old value of the tangent vector for every subband.

The second example embodiment is shown in the UE-gNB procedure of FIG. 7.

1. After building p(n+1,k) as in first 4 steps of Embodiment 1 (at 710, 720, 730, and 740).
2. The UE decides (at 750) whether or not the gNB should use the old value of the tangent vector i.e. $b^k[n+1] = b^k[n]$.
3. The UE communicates (at 760) to the gNB a bit-map tangent prediction vector pi(n+1,k) in a first part of uplink control signalling, with which and in addition to p(n+1,k), the gNB (at 770) can estimate the UL overhead.
4. For all subbands which had a value of '1' inside p'(n+1,k), the UE is going to feed back a new value for the tangent vector b[n+1] (at 780) in a second part of uplink control signaling.
5. For all subbands which had a value of '0' inside p'(n+1,k), the gNB is going to use $b^k[n+1] = b^k[n]$ and UE is going to only send the step size parameter (at 790) in a second part of uplink control signaling (or maybe send nothing and gNB will then use the older value of $\epsilon$).

Embodiment 3. In a third example embodiment, the UE is only going to feedback the step size parameter per subband. The gNB will either use an old value for the tangent vector or compute it itself from previous feedback transmissions, i.e. $b^k[n+1] = b^k[n]$ on all subbands.

Figure 8:
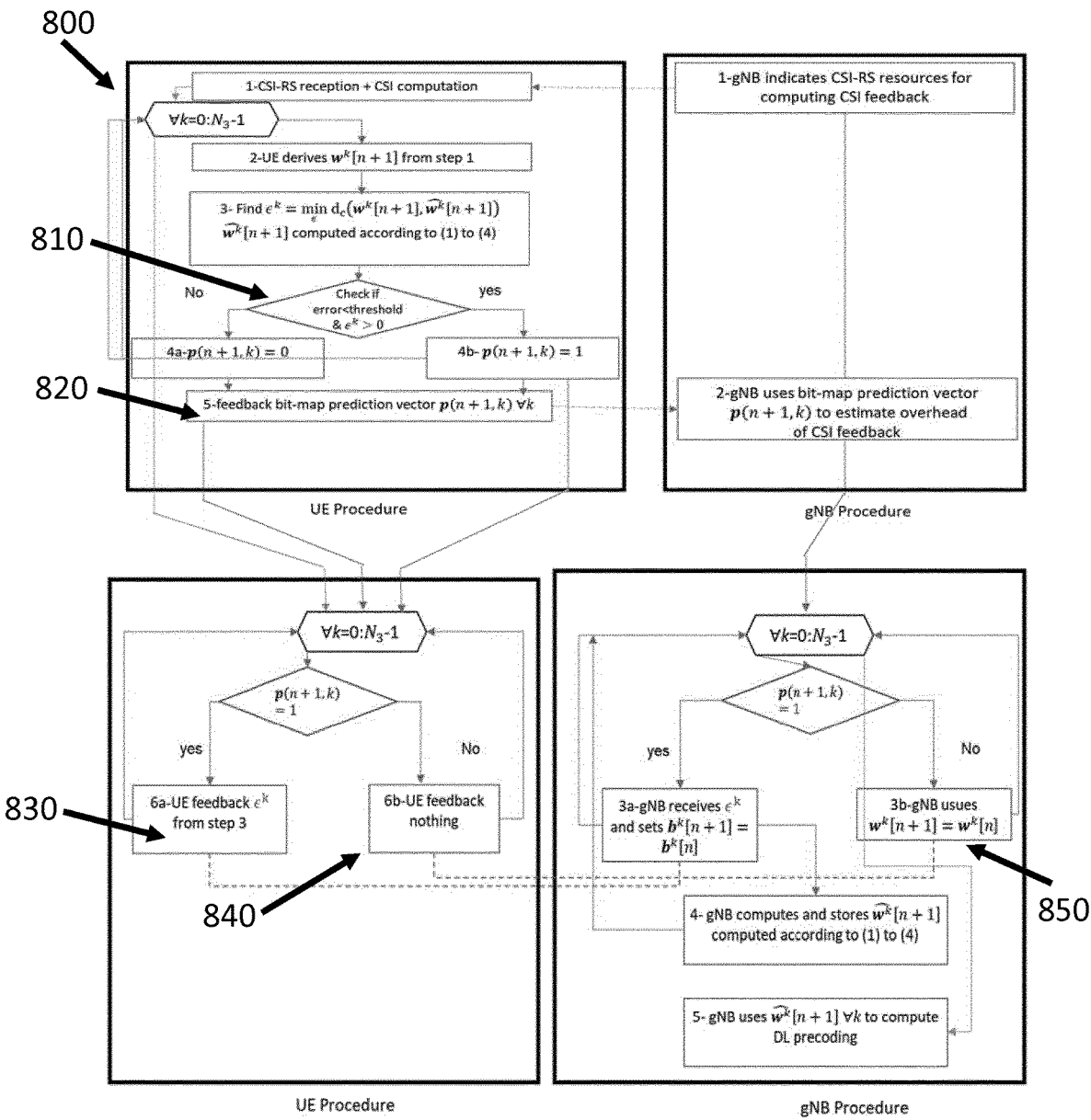
FIG. 8 illustrates a process for performing channel state information prediction according to a third example embodiment of the invention in which a user equipment (UE) feeds back a step size per subband.

The third example embodiment is shown in the UE-gNB procedure 800 of FIG. 8. Possibly the least complex realization of the scheme, the third example embodiment is where it is assumed that gNB has $w^k[n-1]$ and $w^k[n]$ from previous transmissions and hence can compute b[n+1], alternatively gNB may also have an older value of b[n+1] via a feedback from UE. In any case:

1. The UE builds the bit-map prediction vector (at 810) indicating which subbands are going to be predicted and which subbands are not going to be predicted and feeds back (at 820) in a first part of uplink control signaling.
2. For all subbands which had a value of '1' inside p'(n+1,k), the UE is going to feed back (at 830) the optimum step size $\epsilon^k$ in a second part of uplink control signalling, for all other subbands, the UE is not going to feed back anything (at 840). The gNB will just use the old value of $w^k[n]$ (at 850), i.e. $w^k[n+1] = w^k[n]$.

Considering the disclosed example embodiments further, more efficient transmission of $\epsilon^k$ can be considered by exploiting the channel frequency correlation. For example, a) $\epsilon^k$ can be assumed constant over a group of subbands; or b) $\epsilon^k$ can be quantized differentially across the different subbands. Meaning that an average wideband (WB) value of $\epsilon^k$ is sent (e.g. $\epsilon$) and for every subband k only the differential information $$\frac{\epsilon^k}{\epsilon}$$

is sent; or c) $\epsilon^k$ is fed back over only an equidistant subset of the subbands and the rest are provided via channel frequency interpolation.

$\epsilon^k$ can be layer common (same value of $\epsilon^k$ is used for all layers on 1 subband) or layer specific (different values of $\epsilon^k$ are used for each layer on 1 subband).

More efficient transmission of $b^k[n+1]$ can be implemented by exploiting the channel frequency correlation. For example, assuming a matrix of all tangent vectors for one layer $B_{2L \times N_3} = [b^1[n+1], \ldots, b^{N_3}[n+1]]$, two compression techniques can be proposed: a) by applying DFT compression on top of $B_{2L \times N_3}$ as in Rel. 16 NR type II CSI. This means that instead of feeding back quantized $Br_{2L \times N_3}$, we shall apply codebook based DFT compression on top to arrive at $\tilde{B}_{2L \times M_b} = B_{2L \times N_3} W_{fb}$, where $W_{fb}$ is a matrix obtained from a DFT codebook. Instead of feeding back quantized $B_{2L \times N_3}$ we only need to feedback $\tilde{B}_{2L \times M_b}$ where $M_b < N_3$ plus codebook indices needed to build $W_{fb}$. At the gNB side, $B_{2L \times N_3}$ can be reconstructed as $B_{2L \times N_3} = \tilde{B}_{2L \times M_b} W_{fb}^H$; b) by applying differential quantization across subbands of $B_{2L \times N_3}$ as in NR type II CSI Rel.15. This means that a wideband vector of amplitudes for example defined as x of size $2L \times 1$ is fed back to the gNB. In addition, subband amplitude is computed in a differential manner to the corresponding WB amplitude and fed back to the gNB. Phase information can be fed back per subband.

$b^k[n+1]$ and $\epsilon^k$ can be updated at different feedback rates. It can make sense to use the fed back value of $\epsilon^k$ to deduce which subbands are going to be predicted and which are not going to be predicted instead of the bit-map vector p(n+1,0, i.e. not send p(n+1,0 at all. Note that $\epsilon^k = 0$ means it is best to do no prediction and to use the old value simply. This is especially relevant when the number of bits assigned to quantize $\epsilon^k$ is small (e.g., approximately 2-3 bits). For Rel. 16, and example embodiments 1 or 2, this is actually a must since what is fed back from UE is not the channel eigenvector per subband rather the compressed LC coefficients $\tilde{W}_2$ as explained above by the description of Equation (2), so there is no option for the UE to feed back channel eigenvector for a specific subband. Hence if $\epsilon^k = 0$ is an option in the quantizer of the step size parameter, the bit-map p(n+1,0 can be spared.

Alternatively, if the bit-map prediction vector p(n+1,0 is going to be fed back, the quantizer of the step size parameter can be designed not to include the value $\epsilon^k = 0$ in order to put more quantization levels in the interesting dynamic range and hence reduce quantization error.

Note that for Rel. 15 or for Rel.16 (and which is also relevant to the third example embodiment), if the bit-map vector p(n+1,0 is going to be fed back to the gNB, the quantization codebook of $E^k$ can be designed not to include the value 0. That is because the value 0 means that no prediction would occur and this information is already available at the gNB via knowledge of bit-map vector p(n+1,k). This in turn can lead into a reduced quantization error because more quantization steps can be assigned to the dynamic range.

The described example embodiments were implemented assuming rank=1 transmission, however the examples disclosed herein can also be extended to be applied on every layer independently. Alternatively the prediction can be done using all orthogonal layers on one subband simultaneously.

Furthermore, the examples described herein are exploiting the correlation in time. However, the examples described herein can also be combined with a CSI compression scheme which works on the layer domain, e.g. Givens transformation.

Figure 9:
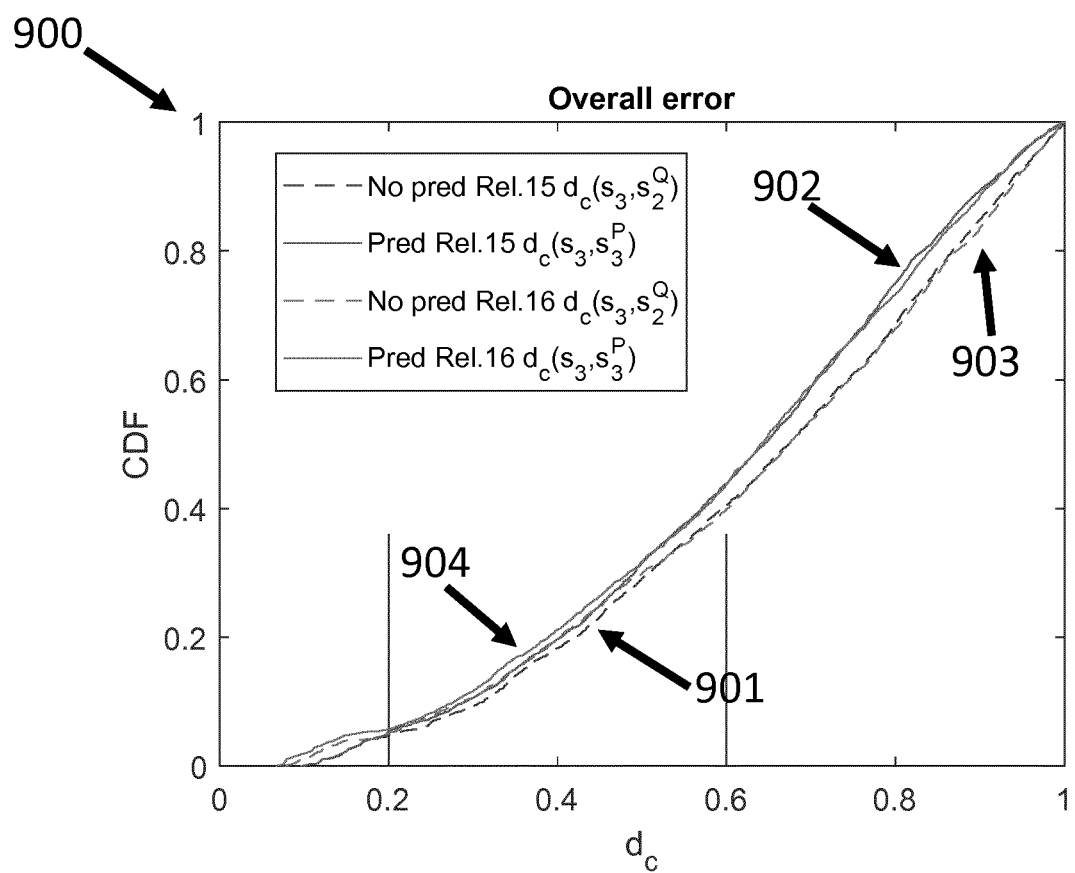
FIG. 9 illustrates the chordal distance CDF using the prediction scheme of the third example embodiment shown in FIG. 8 applied on Rel. 15 and Rel. 16 NR type II CSI.

FIG. 9 depicts the chordal distance CDF using the prediction scheme of FIG. 8 (the third example embodiment) applied on Rel.15 and Rel.16 NR type II CSI as chart 900. $s_3^P$ denotes the predicted channel eigenvector at the third time instant 3 (15 ms). Plot 901 corresponds to No pred Rel. 15 $d_c(s_3, s_2^Q)$, plot 902 corresponds to Pred Rel. 15 $d_c(s_3, s_3^P)$, plot 903 corresponds to No pred Rel. 16 $d_c(s_3, s_2^Q)$, and plot 904 corresponds to Pred Rel. 16 $d_c(s_3, s_3^P)$. As shown, the proposed scheme in the third example embodiment could reduce the chordal distance error to the true value of the channel eigenvector $s_3$. The simulation result was the outcome of the example third embodiment applied on 210 users with the same simulation conditions used to produce FIG. 4. 2 bits of quantization were used to quantize $E^k$.

Figure 10A:
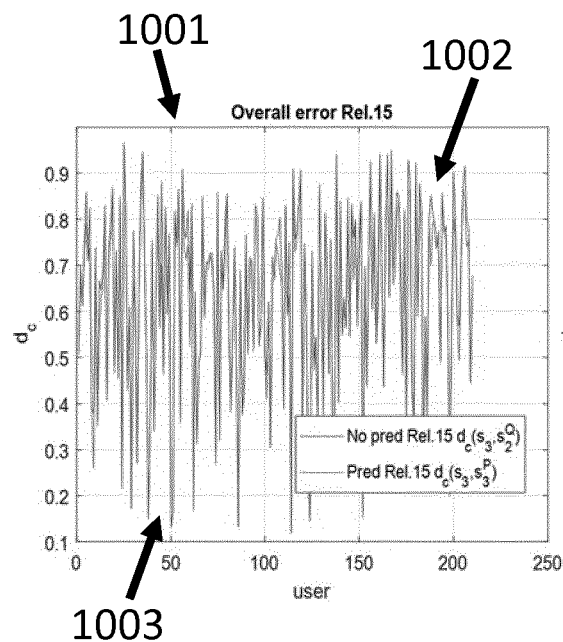
FIG. 10A illustrates the average chordal distance per user for Rel. 15 NR type II CSI.
Figure 10B:
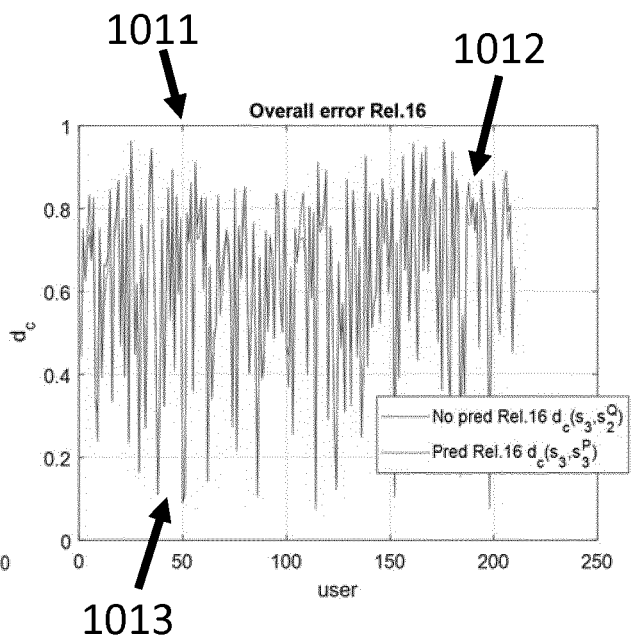
FIG. 10B illustrates the average chordal distance per user for Rel. 16 for NR type II CSI.

FIG. 10A shows the average chordal distance per user for Rel. 15 NR type II CSI. FIG. 10B shows the average chordal distance per user for Rel. 16 NR type II CSI. Chart 1001 shows the overall error for Rel. 15, and chart 1011 shows the overall error for Rel. 16. In chart 1001, plot 1002 corresponds to No pred Rel. 15 $d_c(s_3, s_2^Q)$, and plot 1003 corresponds to Pred Rel. 15 $d_c(s_3, s_2^Q)$. In chart 1011, plot 1012 corresponds to No pred Rel. 16 $d_c(s_3, s_2^Q)$, and plot 1013 corresponds to Pred Rel. 16 $d_c(s_3, s_3^P)$. As shown, geodesic prediction was quite helpful for users with high chordal distance, for users with small chordal distance that meant using the old value of the channel eigenvector was good enough and there was not necessarily a need for an update.

On average approximately 7 subbands were predicted. This required an overhead of 14 bits to feed back $\epsilon^k$, in addition to the bit-map overhead the total UL overhead is 14+13=27 bits. In case $\epsilon^k$ is used as a bit-map instead of the bit-map prediction vector as in p(n+1,0, the overhead required is 26 bits, which is quite small compared to the overhead of Rel.15 type II CSI (350 bits) and Rel. 16 type II CSI (around 230 bits) for maximum rank=1.

In accordance with an example method, a method may be provided comprising determining whether or not geodesic prediction is to be performed; transmitting the determination of whether or not geodesic prediction is to be performed in a first part of uplink control signaling; in response to determining that geodesic prediction is not to be performed, transmitting a current channel estimate in a second part of uplink control signaling; and in response to determining that geodesic prediction is to be performed, transmitting either a determined current value of a tangent vector, or a determined step size parameter, or both the determined current value of the tangent vector and the determined step size parameter in the second part of uplink control signaling; wherein channel state information is predicted based on information provided in the first part of uplink control signaling and the second part of uplink control signaling.

In accordance with an example method, a method may be provided comprising determining whether or not geodesic prediction is to be performed; transmitting the determination of whether or not geodesic prediction is to be performed in a first part of uplink control signaling; in response to determining that geodesic prediction is not to be performed, transmitting a current channel estimate in a second part of uplink control signaling; and in response to determining that geodesic prediction is to be performed: determining whether or not a determined prior value of a tangent vector is to be used; transmitting the determination of whether or not the prior value of the tangent vector is to be used in the first part of uplink control signaling; in response to determining that the prior value of the tangent vector is not to be used, transmitting either a determined current value of the tangent vector, or a determined step size parameter, or both the determined current value of the tangent vector and the determined step size parameter in the second part of uplink control signaling; in response to determining that the prior value of the tangent vector is to be used, transmitting either a determined step size parameter or nothing in the second part of uplink control signaling; wherein channel state information is predicted based on information provided in the first part of uplink control signaling and the second part of uplink control signaling.

In accordance with an example apparatus, an apparatus may be provided comprising: at least one processor; and at least one memory including computer program code; wherein the at least one memory and the computer program code are configured to, with the at least one processor, cause the apparatus at least to perform: determining whether or not geodesic prediction is to be performed; transmitting the determination of whether or not geodesic prediction is to be performed in a first part of uplink control signaling; in response to determining that geodesic prediction is not to be performed, transmitting a current channel estimate in a second part of uplink control signaling; and in response to determining that geodesic prediction is to be performed, transmitting either a determined current value of a tangent vector, or a determined step size parameter, or both the determined current value of the tangent vector and the determined step size parameter in the second part of uplink control signaling; wherein channel state information is predicted based on information provided in the first part of uplink control signaling and the second part of uplink control signaling.

In accordance with an example apparatus, an apparatus may be provided comprising: at least one processor; and at least one memory including computer program code; wherein the at least one memory and the computer program code are configured to, with the at least one processor, cause the apparatus at least to perform: determining whether or not geodesic prediction is to be performed; transmitting the determination of whether or not geodesic prediction is to be performed in a first part of uplink control signaling; in response to determining that geodesic prediction is not to be performed, transmitting a current channel estimate in a second part of uplink control signaling; and in response to determining that geodesic prediction is to be performed: determining whether or not a determined prior value of a tangent vector is to be used; transmitting the determination of whether or not the prior value of the tangent vector is to be used in the first part of uplink control signaling; in response to determining that the prior value of the tangent vector is not to be used, transmitting either a determined current value of the tangent vector, or a determined step size parameter, or both the determined current value of the tangent vector and the determined step size parameter in the second part of uplink control signaling; in response to determining that the prior value of the tangent vector is to be used, transmitting either a determined step size parameter or nothing in the second part of uplink control signaling; wherein channel state information is predicted based on information provided in the first part of uplink control signaling and the second part of uplink control signaling.

In accordance with an example non-transitory program storage device, a non-transitory program storage device may be provided comprising a non-transitory program storage device readable by a machine, tangibly embodying a program of instructions executable by the machine for performing operations, the operations comprising: determining whether or not geodesic prediction is to be performed; transmitting the determination of whether or not geodesic prediction is to be performed in a first part of uplink control signaling; in response to determining that geodesic prediction is not to be performed, transmitting a current channel estimate in a second part of uplink control signaling; and in response to determining that geodesic prediction is to be performed, transmitting either a determined current value of a tangent vector, or a determined step size parameter, or both the determined current value of the tangent vector and the determined step size parameter in the second part of uplink control signaling; wherein channel state information is predicted based on information provided in the first part of uplink control signaling and the second part of uplink control signaling.

In accordance with an example non-transitory program storage device, a non-transitory program storage device may be provided comprising a non-transitory program storage device readable by a machine, tangibly embodying a program of instructions executable by the machine for performing operations, the operations comprising: determining whether or not geodesic prediction is to be performed; transmitting the determination of whether or not geodesic prediction is to be performed in a first part of uplink control signaling; in response to determining that geodesic prediction is not to be performed, transmitting a current channel estimate in a second part of uplink control signaling; and in response to determining that geodesic prediction is to be performed: determining whether or not a determined prior value of a tangent vector is to be used; transmitting the determination of whether or not the prior value of the tangent vector is to be used in the first part of uplink control signaling; in response to determining that the prior value of the tangent vector is not to be used, transmitting either a determined current value of the tangent vector, or a determined step size parameter, or both the determined current value of the tangent vector and the determined step size parameter in the second part of uplink control signaling; in response to determining that the prior value of the tangent vector is to be used, transmitting either a determined step size parameter or nothing in the second part of uplink control signaling; wherein channel state information is predicted based on information provided in the first part of uplink control signaling and the second part of uplink control signaling.

In accordance with an example apparatus, an apparatus may be provided comprising means for determining whether or not geodesic prediction is to be performed; means for transmitting the determination of whether or not geodesic prediction is to be performed in a first part of uplink control signaling; in response to determining that geodesic prediction is not to be performed, means for transmitting a current channel estimate in a second part of uplink control signaling;

and in response to determining that geodesic prediction is to be performed, means for transmitting either a determined current value of a tangent vector, or a determined step size parameter, or both the determined current value of the tangent vector and the determined step size parameter in the second part of uplink control signaling; wherein channel state information is predicted based on information provided in the first part of uplink control signaling and the second part of uplink control signaling.

In accordance with an example apparatus, an apparatus may be provided comprising: means for determining whether or not geodesic prediction is to be performed; means for transmitting the determination of whether or not geodesic prediction is to be performed in a first part of uplink control signaling; in response to determining that geodesic prediction is not to be performed, means for transmitting a current channel estimate in a second part of uplink control signaling; and in response to determining that geodesic prediction is to be performed: means for determining whether or not a determined prior value of a tangent vector is to be used; means for transmitting the determination of whether or not the prior value of the tangent vector is to be used in the first part of uplink control signaling; in response to determining that the prior value of the tangent vector is not to be used, means for transmitting either a determined current value of the tangent vector, or a determined step size parameter, or both the determined current value of the tangent vector and the determined step size parameter in the second part of uplink control signaling; in response to determining that the prior value of the tangent vector is to be used, means for transmitting either a determined step size parameter or nothing in the second part of uplink control signaling; wherein channel state information is predicted based on information provided in the first part of uplink control signaling and the second part of uplink control signaling.

In accordance with an example method, a method may be provided comprising: receiving a determination of whether or not geodesic prediction is to be performed in a first part of uplink control signaling; in response to receiving a determination that geodesic prediction is not to be performed, predicting channel state information based on information provided in the first part of uplink control signaling and based on receiving a current channel estimate in a second part of uplink control signaling; and in response to receiving a determination that geodesic prediction is to be performed, predicting channel state information based on information provided in the first part of uplink control signaling and based on receiving either a current value of a tangent vector, or a step size parameter, or both the current value of the tangent vector and the step size parameter in the second part of uplink control signaling.

In accordance with an example method, a method may be provided comprising: receiving a determination of whether or not geodesic prediction is to be performed in a first part of uplink control signaling; in response to receiving a determination that geodesic prediction is not to be performed, predicting channel state information based on information received in the first part of uplink control signaling and based on receiving a current channel estimate in a second part of uplink control signaling; and in response to receiving a determination that geodesic prediction is to be performed: predicting channel state information based on receiving a determination of whether or not a prior value of the tangent vector is to be used in the first part of uplink control signaling; in response to receiving a determination that the prior value of the tangent vector is not to be used, predicting channel state information based on either receiving a current value of the tangent vector, or receiving a step size parameter, or both receiving the current value of the tangent vector and receiving the step size parameter in the second part of uplink control signaling; in response to receiving a determination that the prior value of the tangent vector is to be used, predicting channel state information based on either receiving the step size parameter or nothing in the second part of uplink control signaling.

In accordance with an example apparatus, an apparatus may be provided comprising: at least one processor; and at least one memory including computer program code; wherein the at least one memory and the computer program code are configured to, with the at least one processor, cause the apparatus at least to perform: receiving a determination of whether or not geodesic prediction is to be performed in a first part of uplink control signaling; in response to receiving a determination that geodesic prediction is not to be performed, predicting channel state information based on information provided in the first part of uplink control signaling and based on receiving a current channel estimate in a second part of uplink control signaling; and in response to receiving a determination that geodesic prediction is to be performed, predicting channel state information based on information provided in the first part of uplink control signaling and based on receiving either a current value of a tangent vector, or a step size parameter, or both the current value of the tangent vector and the step size parameter in the second part of uplink control signaling.

In accordance with an example apparatus, an apparatus may be provided comprising: at least one processor; and at least one memory including computer program code; wherein the at least one memory and the computer program code are configured to, with the at least one processor, cause the apparatus at least to perform: receiving a determination of whether or not geodesic prediction is to be performed in a first part of uplink control signaling; in response to receiving a determination that geodesic prediction is not to be performed, predicting channel state information based on information received in the first part of uplink control signaling and based on receiving a current channel estimate in a second part of uplink control signaling; and in response to receiving a determination that geodesic prediction is to be performed: predicting channel state information based on receiving a determination of whether or not a prior value of the tangent vector is to be used in the first part of uplink control signaling; in response to receiving a determination that the prior value of the tangent vector is not to be used, predicting channel state information based on either receiving a current value of the tangent vector, or receiving a step size parameter, or both receiving the current value of the tangent vector and receiving the step size parameter in the second part of uplink control signaling; in response to receiving a determination that the prior value of the tangent vector is to be used, predicting channel state information based on either receiving the step size parameter or nothing in the second part of uplink control signaling.

In accordance with an example non-transitory program storage device, a non-transitory program storage device may be provided comprising a non-transitory program storage device readable by a machine, tangibly embodying a program of instructions executable by the machine for performing operations, the operations comprising: receiving a determination of whether or not geodesic prediction is to be performed in a first part of uplink control signaling; in response to receiving a determination that geodesic prediction is not to be performed, predicting channel state information based on information provided in the first part of uplink control signaling and based on receiving a current channel estimate in a second part of uplink control signaling; and in response to receiving a determination that geodesic prediction is to be performed, predicting channel state information based on information provided in the first part of uplink control signaling and based on receiving either a current value of a tangent vector, or a step size parameter, or both the current value of the tangent vector and the step size parameter in the second part of uplink control signaling.

In accordance with an example non-transitory program storage device, a non-transitory program storage device may be provided comprising a non-transitory program storage device readable by a machine, tangibly embodying a program of instructions executable by the machine for performing operations, the operations comprising: receiving a determination of whether or not geodesic prediction is to be performed in a first part of uplink control signaling; in response to receiving a determination that geodesic prediction is not to be performed, predicting channel state information based on information received in the first part of uplink control signaling and based on receiving a current channel estimate in a second part of uplink control signaling; and in response to receiving a determination that geodesic prediction is to be performed: predicting channel state information based on receiving a determination of whether or not a prior value of the tangent vector is to be used in the first part of uplink control signaling; in response to receiving a determination that the prior value of the tangent vector is not to be used, predicting channel state information based on either receiving a current value of the tangent vector, or receiving a step size parameter, or both receiving the current value of the tangent vector and receiving the step size parameter in the second part of uplink control signaling; in response to receiving a determination that the prior value of the tangent vector is to be used, predicting channel state information based on either receiving the step size parameter or nothing in the second part of uplink control signaling.

In accordance with an example apparatus, an apparatus may be comprising: means for receiving a determination of whether or not geodesic prediction is to be performed in a first part of uplink control signaling; in response to receiving a determination that geodesic prediction is not to be performed, means for predicting channel state information based on information provided in the first part of uplink control signaling and based on receiving a current channel estimate in a second part of uplink control signaling; and in response to receiving a determination that geodesic prediction is to be performed, means for predicting channel state information based on information provided in the first part of uplink control signaling and based on receiving either a current value of a tangent vector, or a step size parameter, or both the current value of the tangent vector and the step size parameter in the second part of uplink control signaling.

In accordance with an example apparatus, an apparatus may be provided comprising: means for receiving a determination of whether or not geodesic prediction is to be performed in a first part of uplink control signaling; in response to receiving a determination that geodesic prediction is not to be performed, means for predicting channel state information based on information received in the first part of uplink control signaling and based on receiving a current channel estimate in a second part of uplink control signaling; and in response to receiving a determination that geodesic prediction is to be performed: means for predicting channel state information based on receiving a determination of whether or not a prior value of the tangent vector is to be used in the first part of uplink control signaling; in response to receiving a determination that the prior value of the tangent vector is not to be used, means for predicting channel state information based on either receiving a current value of the tangent vector, or receiving a step size parameter, or both receiving the current value of the tangent vector and receiving the step size parameter in the second part of uplink control signaling; in response to receiving a determination that the prior value of the tangent vector is to be used, means for predicting channel state information based on either receiving the step size parameter or nothing in the second part of uplink control signaling.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   for a subband of a plurality of subbands:
      determine a step size parameter that minimizes a chordal distance between a current channel estimate and a predicted channel estimate, wherein the predicted channel estimate is based on a tangent vector that is a tangent on a geodesic trajectory from a first channel eigenvector on a Grassmannian manifold at a first point in time to a second channel eigenvector on the Grassmannian manifold at a second point in time later than the first point in time, wherein the step size parameter is layer common such that a same value of the step size parameter is used for all layers on a subband, and wherein the step size parameter is chosen to be quantized differentially across different subbands;
      determining whether geodesic prediction is to be performed for the subband based on an error threshold and the minimum chordal distance;
      transmitting the determination that the geodesic prediction is to be performed in a first part of uplink control signaling; and
   in response to determining that geodesic prediction is to be performed for a first subband of the plurality of subbands, transmitting only the determined step size parameters in a second part of uplink control signaling to a base station; and
   in response to determining that the geodesic prediction is not be performed for a second subband of the plurality of subbands, transmitting a current state to the base station.

2. The method as in claim 1, wherein the user equipment does not provide a full update to the base station and only differential information is fed back per subband from the user equipment to the base station.

3. The method as in claim 1,
   wherein only differential information is fed back per subband from a user equipment to the base station based on the geodesic trajectory of the eigenvectors in a time domain.

4. The method as in claim 1,
   wherein a discrete Fourier transform is applied to a matrix of all tangent vectors for one layer.

5. The method as in claim 1,
wherein a differential quantization is applied across subbands of a matrix of all tangent vectors for one layer.

6. The method as in claim 1,
wherein the determination of whether or not geodesic prediction is to be performed is stored in a geodesic bitmap vector.

7. The method as in claim 6, wherein the transmission of the determination of whether or not geodesic prediction is to be performed is via the geodesic bitmap vector.

8. The method as in claim 7, wherein uplink overhead is estimated based on the geodesic bitmap vector.

9. The method as in claim 1, wherein either: the step size parameter is chosen to be either i) constant over a group of subbands, ii) quantized differentially across different subbands, or iii) transmitted over an equidistant subset of the plurality of subbands; or the step size parameter is layer common such that a same value of the step size parameter is used for all layers on a subband, or wherein the step size parameter is layer specific such that different values of the step size parameter are used for each layer on the subband; or a discrete Fourier transform is applied to a matrix of all tangent vectors for one layer, or wherein a differential quantization is applied across subbands of the matrix of all tangent vectors for one layer.

10. An apparatus comprising:
at least one processor; and
at least one memory including computer program code;
wherein the at least one memory and the computer program code are configured to, with the at least one processor, cause the apparatus at least to perform:
for a subband of a plurality of subbands:
determine a step size parameter that minimizes a chordal distance between a current channel estimate and a predicted channel estimate wherein the predicted channel estimate is based on a tangent vector that is a tangent on a geodesic trajectory from a first channel eigenvector on a Grassmannian manifold at a first point in time to a second channel eigenvector on the Grassmannian manifold at a second point in time later than the first point in time, wherein the step size parameter is layer common such that a same value of the step size parameter is used for all layers on a subband;
determining geodesic prediction is to be performed for the subband based on an error threshold and the step size parameter;
transmitting the determination that the geodesic prediction is to be performed in a first part of uplink control signaling; and
in response to determining that geodesic prediction is to be performed for a first subband of the plurality of subbands, transmitting only the determined step size parameter in a second part of uplink control signaling to a base station; and
in response to determining that the geodesic prediction is not be performed for a second subband of the plurality of subbands, transmitting a current state to the base station.

11. The Apparatus of claim 10, wherein the user equipment does not provide a full update to the base station and only differential information is fed back per subband from the user equipment to the base station.

12. The Apparatus of claim 10, wherein only differential information is fed back per subband from a user equipment to the base station based on the geodesic trajectory of the eigenvectors in a time domain.

13. The Apparatus of claim 10, wherein a discrete Fourier transform is applied to a matrix of all tangent vectors for one layer.

14. The Apparatus of claim 10, wherein a differential quantization is applied across subbands of a matrix of all tangent vectors for one layer.

15. The Apparatus of claim 10, wherein the determination of whether or not geodesic prediction is to be performed is stored in a geodesic bitmap vector.

16. The Apparatus of claim 10, wherein the transmission of the determination of whether or not geodesic prediction is to be performed is via the geodesic bitmap vector, and wherein uplink overhead is estimated based on the geodesic bitmap vector.

17. The Apparatus of claim 10, wherein either: the step size parameter is chosen to be either i) constant over a group of subbands, ii) quantized differentially across different subbands, or iii) transmitted over an equidistant subset of the plurality of subbands; or the step size parameter is layer common such that a same value of the step size parameter is used for all layers on a subband, or wherein the step size parameter is layer specific such that different values of the step size parameter are used for each layer on the subband; or a discrete Fourier transform is applied to a matrix of all tangent vectors for one layer, or wherein a differential quantization is applied across subbands of the matrix of all tangent vectors for one layer.

18. A system comprising:
a base station; and
a user equipment comprising a memory and a processor, the memory comprising computer-executable instructions that, when executed by the processor, cause the processor to perform the following operations:
for a subband of a plurality of subbands:
determine a step size parameter that minimizes a chordal distance between a current channel estimate and a predicted channel estimate, wherein the predicted channel estimate is based on a tangent vector that is a tangent on a geodesic trajectory from a first channel eigenvector on a Grassmannian manifold at a first point in time to a second channel eigenvector on the Grassmannian manifold at a second point in time later than the first point in time, wherein the step size parameter is layer common such that a same value of the step size parameter is used for all layers on a subband;
determining geodesic prediction is to be performed for the subband based on an error threshold and the step size parameter;
transmitting the determination that the geodesic prediction is to be performed in a first part of uplink control signaling; and
in response to determining that geodesic prediction is to be performed for a first subband of the plurality of subbands, transmitting only the determined step size parameter in a second part of uplink control signaling to a base station; and
in response to determining that the geodesic prediction is not be performed for a second subband of the plurality of subbands, transmitting a current state to the base station.

19. The system of claim 18, wherein only differential information is fed back per subband from a user equipment to the base station based on the geodesic trajectory of the eigenvectors in a time domain.

20. The system of claim 19, wherein the determination of whether or not geodesic prediction is to be performed is stored in a geodesic bitmap vector; and the transmission of the determination of whether or not geodesic prediction is to be performed is via the geodesic bitmap vector, and wherein uplink overhead is estimated based on the geodesic bitmap vector.

* * * * *